Aug. 26, 1969  E. J. WERSHEY  3,463,969
PRESSURE VENTED ELECTROLYTIC CAPACITOR
Filed July 25, 1967
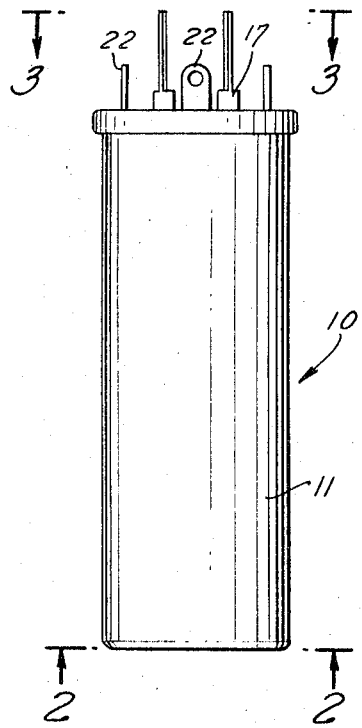
FIG. 1
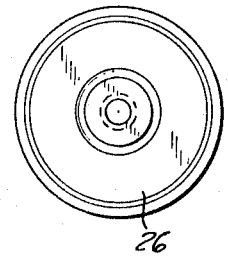
FIG. 2
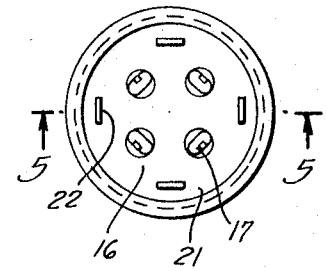
FIG. 3
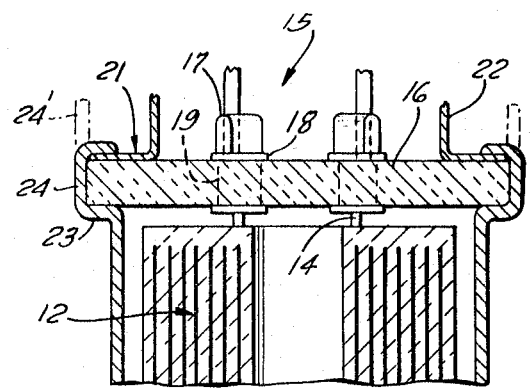
FIG. 5
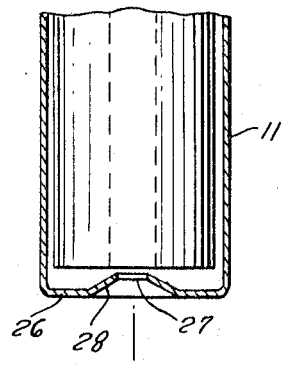
FIG. 4
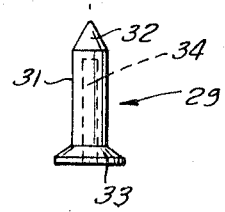
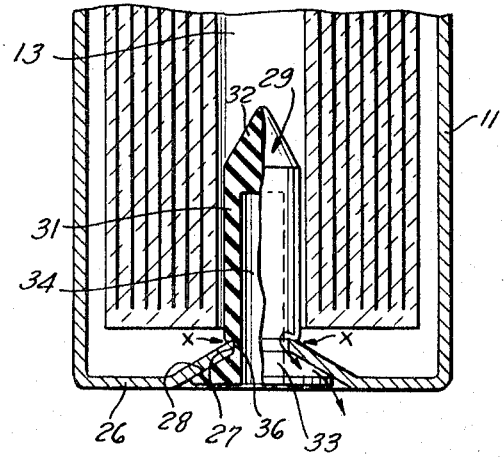
INVENTOR
EDWARD J. WERSHEY
BY
ATTORNEY

United States Patent Office 3,463,969
Patented Aug. 26, 1969

1

3,463,969
PRESSURE VENTED ELECTROLYTIC CAPACITOR
Edward J. Wershey, Summerville, S.C., assignor to Aerovox Corporation, New Bedford, Mass., a corporation of Massachusetts
Filed July 25, 1967, Ser. No. 655,810
Int. Cl. H01g 9/00
U.S. Cl. 317—230       9 Claims

ABSTRACT OF THE DISCLOSURE

This invention relates to the art of electrolytic capacitors, more particularly of the type comprising a cylindrical container in which the capacitor section is positioned. The container has a mouth in which a terminal carrying disc is mounted, the terminals being electrically connected to the terminal leads of the capacitor. The floor of the capacitor has an opening in which a valve member is positioned to permit escape of gas in the container when the pressure therein exceeds a predetermined amount.

---

As conductive to an understanding of the invention, it is noted that when in the manufacture of an electrolytic capacitor in order to prevent movement of the capacitor section in the container, a potting material such as hot pitch is utilized, the assembly operation is relatively difficult due to the flammable nature of such potting material when in liquid state and the operation is messy and time-consuming.

Furthermore, if the temperature in the container and hence the gas pressure therein should rise above a predetermined amount, such pressure may cause the electrolyte with which the capacitor section is impregnated as well as the pitch, which liquefies with the temperature increase, to be forced out of the container around the terminal mounts carried by the closure disc of the capacitor.

Since the electrolytic capacitors are generally mounted on a mounting board or chassis with their terminal leads against the latter, discharge of the conductive electrolyte against the printed circuit carried by the mounting board or against exposed leads of the wiring carried by the chassis can cause short circuits with resultant malfunctioning of the equipment.

Furthermore, discharge of the pitch will coat the wiring necessitating cleaning thereof.

Where the capacitor has a sealed vent opening which is permanently covered and which will rupture if the pressure in the container exceeds a predetermined amount, once this occurs the capacitor is no longer usable and must be discarded.

It is accordingly among the objects of the invention to provide an electrolytic capacitor which may readily be assembled without the need for potting material yet with assurance that the capacitor section will remain in fixed position in the container and which will continuously relieve any pressure build-up in the container to insure that it will not attain a dangerous level that could cause explosion of the container and also will relieve such pressure in direction away from the region where the terminals of the section are connected to the chassis and with

2 assurance that no electrolyte will be discharged with such pressure relief, which could cause a short circuit.

According to the invention, these objects are accomplished by the arrangement and combination of elements hereinafter described and more particularly recited in the claims.

In the accompanying drawings in which are shown one of various possible embodiments of the several features of the invention, FIG. 1 is a side elevational view of the electrolytic capacitor;

FIG. 2 is a bottom view taken along line 2—2 of FIG. 1;

FIG. 3 is a top view taken along line 3—3 of FIG. 1;

FIG. 4 is a fragmentary exploded sectional view illustrating the assembly of the capacitor, and FIG. 5 is a sectional view taken along line 5—5 of FIG. 3.

Referring now to the drawings, there is shown an electrical capacitor unit 10 of the electrolytic type, which comprises a tubular container 11 of suitable material such as aluminum in which is positioned a tubular capacitor section 12.

The capacitor section 12 may comprise two or more capacitors wound as a single roll and having a central bore 13. The capacitor roll has a multiplicity of terminal leads 14 extending outwardly from its foil electrodes.

Associated with the capacitor section 12 is a terminal lug mount 15 which desirably comprises a rigid disc 16 of insulating material, such as Bakelite or other suitable hard plastic. The disc carries terminal lugs 17 which extend outwardly from the disc 16 at substantially right angles thereto. Each terminal lug has a supporting eyelet 18 integral therewith and extending through a corresponding aperture 19.

Associated with the disc 16 is a ring 21 preferably of metal; of outside diameter substantially equal to that of the disc 16, the ring desirably being formed with a plurality of fingers 22 on the inner periphery thereof. The fingers 22 serve to mount the capacitor to the chassis of electrical equipment in conventional manner, such as, for example, by passing such fingers through suitable openings in the chassis and bending them inwardly or outwardly as desired.

In order to secure the disc 16 and ring 21 in position, the mouth of the capacitor has an outwardly extending annular flange 23 with an upstanding wall 24. The disc 16, with the ring 21 positioned thereon, is seated on said flange 23 and the upper end 24' of the wall 24 is bent inwardly, securely to lock the disc and ring in position.

According to the invention, the floor 26 of the container 11 is formed with an axial opening 27 at the inner end of a frusto-conical indentation 28, which is of smaller diameter at its inner end to define said opening 27, said indentation defining a well in the interior of said container.

Positioned in said indentation 28 and extending axially through said opening 27 is a vent plug 29. As shown in FIGS. 4 and 5, the vent plug which is of resilient material such as rubber, has a stem portion 31 with a conical end 32 and a base portion 33 of configuration complementary to that of the frusto-conical indentation 28.

The vent plug has an axial bore 34 extending through the base 33 into the stem portion 31 and the diameter of the stem 31 is slightly greater than the diameter of opening 27.

Thus, when the plug 29 is pushed through opening 27 until the base 33 seats on the frusto-conical surface 28 of the indentation, the stem 31 will extend into the bore 13 of the capacitor section 12 to retain the latter in axial alignment. The compression of the stem as at 36 caused by the fact that the diameter of opening 27 is less than that of the stem 31, will retain said vent plug in position in said opening 27.

In the assembly of the capacitor, the terminals 17 mounted on disc 16 are first electrically connected to the terminal leads 14 of the capacitor section 12 which is impregnated with electrolyte and the section 12 is then inserted into the container 11 with the periphery of disc 16 seated on annular flange 23. Thereupon, the ring 21 is positioned on the periphery of the disc 16 and the upper end 24' of the wall 24 is bent inwardly from the position shown in broken lines in FIG. 5 to the position shown in full lines, securely to clamp the ring and disc in position. Thereupon, the unit is suitably aged in conventional manner.

When the aging operation is completed, the plug 29 is then forced into the opening 27 so that the stem portion 31 thereof enters into the bore 13 of the section 12, to retain the latter in axial alignment in the container 11.

Since the diameter of the stem 31 is greater than that of the opening 27, as shown in FIG. 5, the portion 36 of the stem 31 aligned with the periphery of the opening 27 will be forced inwardly forming a dependable seal.

In use of the capacitor, if the gas pressure therein should build up above a predetermined amount, it will react against the periphery of the plug 29 at the region indicated as X in FIG. 5. As a result, the stem 31 of the plug will be compressed at such region so that the gas can escape through the opening 27 and between the adjacent conical surfaces of the base 33 and indentation 28 and when the pressure has dropped, a seal will again be formed at such region X. Although even a solid plug would perform the same function, a hollow plug, as shown, is preferred.

It is to be noted that the increase of gas pressure is associated with an increase in temperature in the unit.

However, due to the relief of pressure provided by the vent plug, normally the temperature increase is not sufficient to cause liquefication of the electrolyte. Even though some liquefication should occur, and some of the electrolyte should be discharged as the pressure is relieved, such discharge would be in direction away from the terminals of the capacitor and hence the printed circuit or wiring will not be affected.

Thus, the vent plug 29 provides for continuous discharge of gas from the container 11 when the pressure exceeds a predetermined amount and the plug will automatically seal the opening 27 as soon as the gas pressure is relieved.

It is the characteristic of electrolytic capacitors to cure themselves if any slight perforations in their dielectric should occur. However, such perforations cause increase in temperature and hence increase in gas pressure with further increase in temperature. By reason of the vent plug of this invention, automatic relief of pressure is provided which prevents excessive and rapid build-up of temperature with attendant possibility of rupture of the container, or discharge of electrolyte onto the printed circuit or wiring with attendant possibility of short circuit.

Furthermore, the pressure relief provided assures that the capacitor will operate relatively cool even when subjected to over-load conditions and have a long life.

If the pressure should build up with attendant increase in temperature, the leakage current of the capacitor would build up which is undesirable and which is avoided by the vent plug of the present invention.

If the pressure in the container should increase at an extremely rapid rate, this would cause the vent plug to be blown out to relieve such pressure and prevent rupture of the container.

By reason of the fact that the stem of the vent plug is positioned in the bore of the capacitor section, the latter is securely retained in position without the need for potting material such as pitch with its attendant disadvantages heretofore noted.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An electrolytic capacitor unit comprising a hollow casing having a floor at one end and a mouth at the other end, a capacitor section in said casing, a cover member comprising a disc of substantially rigid insulating material, said cover member having terminals protruding therefrom and electrically connected to said capacitor section, means securely mounting said cover member in the mouth of said container, said container floor having an approximately centrally located opening and a resilient surfaced valve plug in said opening engaging the side wall around the opening for closing the opening while permitting release of gaseous pressures from said container therethrough.

2. The combination set forth in claim 1 in which said capacitor section is substantially cylindrical and has an axial bore aligned with the opening in the floor of said container, said valve having an inwardly extending portion positioned in said bore to prevent displacement of said capacitor section.

3. The combination set forth in claim 1 in which said container is substantially cylindrical, said capacitor section is substantially cylindrical and has an axial bore aligned with the opening in the floor of said container, said valve comprising a plug of resilient material having a base positioned externally of the floor of said container and a stem extending through said opening into the adjacent end of the bore of said capacitor section.

4. The combination set forth in claim 1 in which said container is substantially cylindrical, said capacitor section is substantially cylindrical and has an axial bore aligned with the opening in the floor of said container, said valve comprising a plug of resilient material having a base positioned externally of the floor of said container and a stem extending through said opening into the adjacent end of the bore of said capacitor section, said stem being of diameter slightly greater than the diameter of said opening for releasable retention therein, the region between the periphery of said opening and the adjacent periphery of said stem defining a valve which will open when the pressure in said container exceeds a predetermined amount.

5. The combination set forth in claim 1 in which said container floor has a frusto-conical indentation in the floor thereof, the smaller diameter inner end of said indentation defining said opening and said valve member comprising a plug of resilient material having a base portion and a stem portion, said base portion being of configuration complementary to that of said indentation and adapted to seat thereagainst with said stem portion extending through said opening into the adjacent end of the bore of said capacitor section.

6. The combination set forth in claim 5 in which said frusto-conical indentation in said floor defines a well in the interior of said capacitor section between said floor and the adjacent end of said capacitor section, 7. The combination set forth in claim 5 in which said plug has an axial bore extending through the base thereof into said stem and the diameter of said stem is slightly greater than the diameter of said opening, for releasable retention therein, the region between the periphery of said opening and the adjacent periphery of said stem defining a valve which will open when the pressure in said container exceeds a predetermined amount.

8. The combination set forth in claim 7 in which both said container and said capacitor section are substantially cylindrical and said opening is axially aligned with said capacitor section.

9. The combination set forth in claim 7 in which said casing is of aluminum.

References Cited

UNITED STATES PATENTS

| 2,011,890 | 8/1935 | Boessenkoal | 317—230 |
| 2,113,405 | 4/1938 | Junken | 317—230 |
| 2,183,091 | 12/1939 | Claassen et al. | 317—230 |
| 2,766,408 | 10/1956 | Georgier et al. | 317—230 |
| 3,013,190 | 12/1961 | Nieders | 317—230 |

JAMES D. KALLAM, Primary Examiner

U.S. Cl. X.R.

29—570